Patented Sept. 17, 1940

2,214,815

UNITED STATES PATENT OFFICE 2,214,815

PIGMENT MILLING PROCESS

Marion L. Hanahan, Wilmington, Del., and James D. Prince, Linthicum Heights, Md., assignors to E. I. du Pont de Nemours & Company, Wilmington, Del., a corporation of Delaware No Drawing. Application February 24, 1938, Serial No. 192,314

6 Claims. (Cl. 134—58)

This invention relates to the production of inorganic pigment materials. More particularly it relates to the production of finely divided titanium oxide pigments. Still more particularly it relates to the production of finely divided low oil absorption titanium oxide containing pigments by an improved dry milling process.

Titanium oxide pigments are usually produced by calcination or other heat treatments of a precipitated pigment material comprising titanium oxide. It is well known in the art, that such heat treated titanium oxide pigments contain particles or aggregates which prevent the formation of a smooth, unbroken, and glossy film of paint when made from such a product. This detrimental property is a direct result of the conditions existing in their methods of manufacture. The precipitation step tends to form aggregates of fine particles and the subsequent heat treatments, such as drying and calcination, cement these aggregates by compacting and sintering. It has long been recognized in the art that titanium oxide pigments must be in a relatively finely divided condition in order to be useful in the manufacture of such commodities as paints, paper, rubber, oil cloth coatings, and the like. The present tendency on the part of pigment users is to demand titanium oxide pigments which are even more finely divided than heretofore so that they can disperse the pigments in their products with less work or can improve the quality of their products with no extra work. Furthermore, finely divided titanium oxide pigments of low oil absorption are desired in many paint and enamel formulations on account of their higher tinctorial strength and lower binder requirements.

One commonly used method of producing finely divided calcined titanium oxide pigments is by wet milling. Substantial improvements in the atr of wet milling calcined titanium oxide pigments are disclosed, for example, in U. S. Patent 1,937,037. This process comprises a continuous grinding and hydroseparation circuit in which the calcined pigments are ground and dispersed in aqueous media with the aid of dispersing agents, for example, sodium silicate and the fines are separated from the coarse by hydroseparation and are coagulated, filtered, and dried. Titanium oxide pigments produced by wet milling processes such as that disclosed in U. S. Patent 1,937,037 are valuable in the paint making art on account of their high hiding power and tinctorial strength. However, their oil absorption of from about 24 to about 26 (as determined by the "Standard rub-out method" described on pages 540 and 541 of the 8th edition of "Physical and Chemical Examination of Paints, Varnishes, Lacquers and Colors" by Henry A. Gardner, January, 1937) are higher than are desirable in many paint and enamel formulations. As disclosed in U. S. Patent 1,885,921, substantial reduction of the oil absorption of a titanium oxide pigment is obtained by a pulverizing process in which the particles of pigment are subjected to considerable pressure. This may be accomplished by grinding a few grams of titanium oxide pigment vigorously in a mortar. The same effect may be obtained on an industrial scale by milling the titanium oxide pigment in pulverizing mills such as ring roll mills, edge runner mills, pebble mills, buhrstone mills, and the like. Ring roll mills are usually preferred for this type of milling and in practice are ordinarily equipped with an air separation system which depends on centrifugal force to separate out the coarse particles and return them to the mill for further pulverizing, while allowing the fines to pass on as finished product. It is common knowledge that pulverizing dry solid materials in such mills as ring roll mills, edge runner mills, pebble mills, buhrstone mills, and the like, ordinarily reduces the solid material to an impalpable powder. However, this is not the case with pigments comprising titanium oxide. Pulverizing, as in a ring roll mill equipped with an air separation system, reduces the oil absorption of the titanium oxide pigment by at least 25% from about 24 to 26 down to about 17 to 20. However, the reduction in oil absorption attained by the pulverizing process is accompanied by a sacrifice in texture and an increase in the grittiness of the titanium oxide pigment dry milled according to this process. For example, a titanium oxide pigment manufactured according to the wet milling process disclosed in U. S. Patent 1,937,037 had an oil absorption of 23.6 and a texture of 16 as (determined according to modification "A" of the "Krebs texture test for pigments" described on pages 511 and 512 of the 8th edition of "Physical and Chemical Examination of Paints, Varnishes, Lacquers and Colors" by Henry A. Gardner, January, 1937). Pulverizing the aforementioned pigment in a ring roll mill equipped with an air separation system reduced its oil absorption to 18.5 but also lowered its texture to 10. This decrease in texture is attributed to the compacting or compressive action of the pulverizing process so that many particles of titanium oxide are pressed together in the form of flakelets or pellets which persist in the pigment as coarse aggregates or grit. This is a logical explanation of the surprising effect in that vigorous pulverizing does not produce an impalpable titanium oxide pigment but tends to coarsen the pigment and produce grittiness rather than yield a pigment of finer texture.

The other commonly used method of producing finely divided pigments, in addition to wet milling with or without subsequent dry milling, is by dry milling of the calcined pigment material. Although dry milling of calcined pigment practised according to the prior art does not produce as fine subdivision as does wet milling by a method such as that disclosed in U. S. Patent 1,937,037, it does have a cost advantage in that it does not require the expensive drying step which follows wet milling. Furthermore, it is the only practicable method of milling pigments which are soluble in water or which are not easily dispersed in water. Moreover, it is the only practical method of milling those pigments which are insoluble in water and which may be dispersed in this medium but whose physical properties are affected adversely by the coagulation step in the wet milling process.

One method of dry milling is by disintegrating which is defined on page 664 of the 2nd edition of "Industrial Chemistry" by Emil Raymond Riegel, 1933, as the reduction of egg and nut sizes to a coarse powder and which is accomplished in rotary hammer mills, squirrel cage disintegrators, and the like. Disintegrating, for example, in a rotary hammer mill, when applied to calcined titanium oxide pigments does not produce a fine subdivision of the coarse aggregates formed during the calcination process. Furthermore, it does not reduce pigment oil absorption. For example, a calcined titanium oxide pigment disintegrated in a rotary hammer mill had a texture of only 1 and an oil absorption of as high as 23. The same calcined titanium oxide pigment wet milled according to the process of U. S. Patent 1,937,037 had a texture of about 16 and an oil absorption of about 23.

The more common method of dry milling pigment materials is by the heretofore described pulverizing process which is defined by Emil Raymond Riegel, in the reference cited above, as the reduction of coarse powder to an impalpable powder and which is accomplished in ring roll mills, edge runner mills, pebble mills, buhrstone mills and the like. Pulverizing, for example in a ring roll mill equipped with an air separation system, when applied to calcined titanium oxide pigments reduces pigment oil absorption. However, it does not produce a fine subdivision of the titanium oxide pigment particles. For example, a calcined titanium oxide pigment pulverized in a ring roll mill equipped with an air separation system had an oil absorption of 18 and a texture of 9. The same calcined titanium oxide pigment wet milled according to the process of U. S. Patent 1,937,037 had an oil absorption of about 23 and a texture of about 16.

This invention has as an object the improvement of the grit and fineness properties of titanium oxide pigments. A further object is the improvement of the grit and fineness properties of calcined titanium oxide pigments by an improved dry milling process. A still further object is the improvement of the grit and fineness properties of low oil absorption titanium oxide pigment without further lowering their oil absorption. Additional objects will become apparent from an examination of the following description and claims.

These objects are accomplished by the following invention which broadly comprises series grinding of the pigment, employing pulverizing type milling equipment in series with disintegrating type milling equipment. In a more restricted sense this invention comprises subjecting dry pigments to pulverizing milling, for example, in a ring roll mill or edge runner mill, and then to disintegrating milling, for example, in a rotary hammer mill or squirrel cage disintegrator at a rate of from about 1200 pounds per hour to about 4000 pounds per hour. The preferred embodiment of this invention comprises passing a dry titanium oxide pigment through a 50 inch diameter ring roll mill equipped with an air separation system and then through a 24 inch diameter rotary hammer mill arranged in series, said pigment passing through said arrangement of dry milling equipment at a rate of from about 1600 to about 2300 pounds per hour. This process produces a reduction in pigment oil absorption and also produces a decided improvement of pigment grit and fineness properties.

Various arrangements and selections of equipment for the operation of our process are possible. Various types of pulverizing milling equipment may be employed. We have found that such equipment when used alone breaks down the large hard grit particles in the pigment. At the same time it compacts the pigment, reducing its oil absorption. However, it tends to form relatively soft aggregates which do not break down when the pigment is stirred in oil or water coating compositions and would appear as grit in coatings made from such compositions. Various types of impact grinding equipment may also be used for the operation of our invention. We have found that such equipment when used alone has no effect on pigment oil absorption. It breaks up soft pigment aggregates but has little if any effect on hard grit particles.

In the preferred arrangement of equipment the dry pigment is subjected to pulverizing milling in a ring roll type mill equipped with an air separation system which separates the coarse particles from the fines, returning said coarse particles to the mill for further grinding and discharging said fines. The fines, which contain an undesirable quantity of objectionable pigment aggregates, are subjected to disintegrating milling in a rotary hammer mill. The ring roll mill breaks up hard pigment grit and reduces oil absorption while the rotary hammer mill breaks up the relatively soft pigment aggregates formed during the ring roll milling operation.

The following examples are given for illustrative purposes and are not intended to place any limitations upon the herein described invention:

Example I

Six samples of titanium dioxide which had been wet milled according to the process of U. S. Patent 1,937,037 and dry milled in a ring roll mill to reduce pigment oil absorption according to the process of U. S. Patent 1,885,921, were further dry milled in a rotary hammer mill with the effects on pigment properties summarized in the following table.

| Pigment | Pigment properties before passage through rotary hammer mill | | | Pigment properties after passage through rotary hammer mill | | |
|---|---|---|---|---|---|---|
| | Paint grit | Texture | 200 mesh water grit | Paint grit | Texture | 200 mesh water grit |
| Sample 1 | 4 | 11 | 1.57 | 7 | 12.5 | 0.42 |
| Sample 2 | 6.5 | 12.5 | 2.31 | 10.5 | 14.5 | 0.65 |
| Sample 3 | 12 | 10.5 | 0.91 | 14 | 12.5 | 0.32 |
| Sample 4 | 10 | 11 | 2.19 | 12 | 12 | 0.36 |
| Sample 5 | 7.5 | 10.5 | 5.10 | 11 | 12 | 0.83 |
| Sample 6 | 4 | 9.5 | 2.82 | 9 | 11.5 | 0.31 |

It will be noted from the above that the herein described invention, on the average, improved paint grit 4 points, improved texture 1.5 points, and reduced 200 mesh water grit to one-fifth of its former level or below one per cent. Furthermore, these improvements in grit characteristics were obtained without any measurable effect on oil absorption properties.

The values for paint grit were determined by a convenient and practical test for the semi-quantitative determination of coarse particles which consists in grinding a properly proportioned mixture of the pigment with a suitable vehicle through a roller mill, the rolls of which are set a small but definite distance apart, or with a definite pressure along the lines of contact. A film prepared from the resulting enamel paint by a "draw-down" on a glass plate or by a "spin-out" is compared for film fineness and for the presence of coarse gritty aggregates against a set of arbitrary standards. The standards which we have used range from "1" at the bottom of the scale, representing a film with extremely coarse particles and sand-like in appearance, to "18" at the top of the scale, representing a film with practically no perceptible coarse particles, smooth and glass-like in appearance. The intermediate standards represent gradual and evenly spaced graduations from one extreme to the other.

The values for texture were determined according to modification "A" of the "Krebs texture test for pigments" outlined on pages 511 and 512 of the 8th edition of "Physical and Chemical Examination of Paints, Varnishes, Lacquers and Colors" by Henry A. Gardner, January, 1937.

200 mesh water grit was determined by a test in which 100 grams of pigment were agitated vigorously for 30 seconds with 300 ml. of distilled water containing 0.5 gram sodium pyrophosphate, after which the suspension was poured on a 200 mesh sieve and the grit remaining on the screen was washed with water, dried and weighed.

The 200 mesh sieve has 74 micron openings and the residue on this sieve is made up of particles that are larger than 74 microns. The samples shown in Example I have 200 mesh screen residues as high as 5.10% and as low as 0.31%. The data show that this screen residue is lowered greatly by the disintegrating grind of the rotary hammer mill. The high values for this coarse residue prior to the rotary hammer milling is due to the compacting action of the ring roll mill (Raymond mill with air separation) upon the titanium oxide pigment thereby causing flakes of pigment. This effect is not readily observed with the more granular and more free flowing pigments but due to the easy packing and sticky character of titanium oxide pigments, we have found that the ring roller milled product must be further milled in the disintegrating type of equipment when the highest quality product is to be produced.

*Example II*

A grade of titanium oxide characterized by low water absorption properties and excellent dispersion characteristics in water, which is used widely in water compositions, is prepared by dry milling calcined titanium dioxide. A customary means of dry milling this titanium dioxide is by use of a ring roll mill equipped with air separator. We have found that if the pigment is milled at a rate of 2300#/hr. in a 50 inch ring roll mill equipped with an air separation system, the product contains about 5% of grit coarser than 325 mesh, as measured by a test in which 3 grams of pigment are agitated vigorously with 300 ml. of distilled water for one minute, poured on a 325 mesh sieve, washed with a very light stream of water, and the grit dried and weighed. By passing the product of this operation through a 24 inch rotary hammer mill also at 2300#/hr. We have reduced the grit to about 0.3%. Ring roll milling alone at the impractically low rate of 1150#/hr. still returns as high as 1% grit, and rotary hammer milling alone at this rate yields grits above 4%.

*Example III*

Calcined titanium dioxide described in Example II, milled at a rate of 2300#/hr. in a 50 inch ring roll mill equipped with air separator, contained 5.2% of 325 mesh water grit. Passage of this pigment through a squirrel cage disintegrator reduced the 325 mesh water grit content to 1.3%.

*Example IV*

Another example of successful application of our invention is in the manufacture of a calcium base titanium oxide pigment containing 30% titanium dioxide and 70% calcium sulfate. This pigment is used widely in paints—fineness is an important property. On account of the solubility of calcium sulfate it cannot be wet milled. We have found that by milling this pigment at a 2000#/hr. rate in a 50 inch ring roll mill equipped with air separator and a 24 inch rotary hammer mill in series a fineness was obtained which showed less than one-half as much grit in paint films as a pigment ground at an equal rate in either unit alone. Furthermore, extensive tests have shown that the same results could not be obtained from the rotary hammer mill or ring roll mill alone.

The above examples are limited to the milling of titanium dioxide and calcium sulfate extended titanium dioxide pigments, by ring roll milling followed by rotary hammer milling or squirrel cage disintegration. However, it must be understood that my invention is applicable to all types of titanium oxide pigment materials such as titanium oxide, and titanium oxide extended with calcium sulfate, barium sulfate, magnesium silicate, calcium carbonate, lithopone, zinc sulfide, and the like. Furthermore, any type of pulverizing milling may be used such as that obtained with a ring roll mill, edge runner mill, pebble mill, buhrstone mill, and the like. In addition, any type of disintegrating milling may be used such as that obtained with a rotary hammer mill, squirrel cage disintegrator, high speed fan, and the like. Furthermore, while we have given preferred sizes for mills, my process is obviously not limited to mills of any particular size. It is however essential that the product first be ground in the pulverizing mill and subsequently in the disintegrating mill.

Our process possesses advantages not previously combined in a dry milling process. Furthermore, the products of our process possess advantages not previously combined in a pigment material. Dry milling in pulverizing equipment which with most dry materials ordinarily returns an impalpable powder, yields, in the case of titanium oxide pigments, a pigment with desirable low oil absorption but with poor texture characteristics. However, subjection of these poor textured low oil absorption titanium oxide pigments to disintegration in rotary hammer mills, squirrel cage disintegrators and the like, which with most materials return a coarse powder, gives the unexpected result of producing titanium oxide pigments of excellent texture and fineness without changing their low oil absorption characteristics. As a consequence, my process allows the production of wet milled low oil absorption titanium oxide pigments of texture as good as the prior art wet milled high oil absorption titanium oxide pigments. Furthermore, it allows the manufacture by dry milling alone of low oil absorption titanium oxide pigments with textures approximating those of prior art wet milled high oil absorption titanium oxide pigments and in addition with desirable properties which would be destroyed by wet milling said low oil absorption titanium oxide pigments.

While our process applies to all pigments comprising titanium oxide it is of particular importance in the case of pigments comprising calcium sulfate and titanium oxide. Wet milling processes cannot be applied to such pigments since none of the dispersing agents known and used for titanium oxide, lithopone, and other pigments, is effective in dispersing pigments comprising calcium sulfate. Furthermore, on account of the solubility of calcium sulfate crystal growth of calcium sulfate occurs so rapidly during the wet milling process that sufficient reduction in particle size cannot be effected even by prolonged wet-grinding. Our process permits the production of pigments comprising calcium sulfate which have markedly superior grit and fineness characteristics compared to such pigments produced by prior art processes.

As many apparently widely different embodiments of this invention may be made without departing from the scope and spirit thereof, it is to be understood that we do not limit ourselves to the specific embodiment except as defined in the appended claims.

Having described the present invention the following is claimed as new and useful.

1. A process for producing improved pigments which comprises subjecting titanium oxide material to a pulverizing type milling operation and thereafter to a disintegrating type milling operation.

2. A process for producing improved pigments which comprises subjecting dry titanium oxide material to pulverizing milling and thereafter to disintegrating milling at a rate of between about 1200 pounds per hour and about 4000 pounds per hour.

3. A process for producing improved pigments which comprises subjecting a dry titanium oxide pigment to pulverizing milling and thereafter to disintegrating milling at a rate of between about 1600 pounds per hour and about 2300 pounds per hour.

4. A process for producing an improved pigment which comprises passing dry titanium oxide pigments through a 50 inch diameter ring roll mill equipped with an air separation system and then through a 24 inch diameter rotary hammer mill arranged in series, said pigment passing through said arrangement of dry milling equipment at a rate of from between 1600 pounds per hour and about 2300 pounds per hour.

5. A process for producing an improved pigment which comprises passing dry titanium oxide extended pigments through a 50 inch diameter ring roll mill equipped with an air separation system and then through a 24 inch diameter rotary hammer mill arranged in series, said pigment passing through said arrangement of dry milling equipment at a rate of from between 1600 pounds per hour and about 2300 pounds per hour.

6. A process for producing an improved pigment which comprises passing dry calcium sulfate extended titanium dioxide pigments through a 50 inch diameter ring roll mill equipped with an air separation system and then through a 24 inch diameter rotary hammer mill arranged in series, said pigment passing through said arrangement of dry milling equipment at a rate of from between 1600 pounds per hour and about 2300 pounds per hour.

MARION L. HANAHAN.
JAMES D. PRINCE.